United States Patent [19]
Takagi et al.

[11] 4,316,234
[45] Feb. 16, 1982

[54] ENCLOSED SWITCHBOARDS

[75] Inventors: Masatomo Takagi, Hachioji; Mitsuo Ogaki, Fuchu; Sadao Hikita, Hachioji, all of Japan

[73] Assignee: Tokyo Shibaura Denki Kabushiki Kaisha, Kawasaki, Japan

[21] Appl. No.: 158,905

[22] Filed: Jun. 12, 1980

[30] Foreign Application Priority Data

Jun. 22, 1979 [JP] Japan .................................. 54-78041

[51] Int. Cl.$^3$ ............................................. H02B 1/04
[52] U.S. Cl. ................................ 361/342; 200/144 R; 200/147 R; 361/2; 361/361
[58] Field of Search .......................... 174/70 B, 71 B; 339/111, 22 B, 258 F, 259 F; 200/144 R, 147 R; 361/2, 334, 335, 338, 341, 342, 356, 358, 361, 378, 391

[56] References Cited

U.S. PATENT DOCUMENTS 3,096,131 7/1963 Adams .
3,710,198 1/1973 Burton .
4,180,845 12/1979 Shariff ................................ 361/361

Primary Examiner—Gerald P. Tolin
Attorney, Agent, or Firm—Stevens, Davis, Miller & Mosher

[57] ABSTRACT

In an enclosed switchboard having a vertical bus bar supported by an insulating cover and unit chambers situated in front of the vertical bar and tiered one above the other for accommodating unit devices, each unit device having a stab-type connector including a tongue-shaped contact for establishing electrical contact with the vertical bus bar, the insulating cover includes a vertically extending channeled portion, the vertical bus bar includes a web in flat engagement with the front face of the bed of the channeled portion, a vertically extending protrusion protruding from the web forwardly, and a flange extending from one of the edges of the web and being in flat engagement with the inner face of one of the side walls of the channeled portion, the protrusion being positioned close to the flange so that as the contact moves sidewardly away from the protrusion it is brought into contact with the flange.

9 Claims, 6 Drawing Figures

ENCLOSED SWITCHBOARDS

BACKGROUND OF THE INVENTION

The present invention relates to an enclosed switchboard having a vertical bus bar and unit chambers situated in front of the vertical bus bar and tiered one above the other for accommodating unit devices.

An example of enclosed switchboard of this type is shown in FIG. 1. The space inside a box-shaped frame 1 is divided by a plurality of shelf sheets 2 to form a plurality of unit chambers 3. Unit devices 9 are removably inserted in the respective unit chambers 3. Each of the unit devices 9 may comprise a circuit breaker, control relays and other control elements mounted on a common frame and electrically connected to have desired control and switching functions. Connection of the unit device 9 to vertical bus bars 5 behind an insulating cover 12 is accomplished by connectors 10 which project from the rear side of the unit device 9 (FIG. 2). When the unit device 9 is inserted in the unit chamber 3, the connectors 10 extend through openings 12a in the insulating cover 12 and are engaged with the vertical bus bars 5 (FIG. 3).

Horizontal bus bars 6 are provided in the top portion of the switchboard and are mounted to the frame 1 by tubular insulators 7 and mounting plates 8. The vertical bus bars 5 are respectively connected to the horizontal bus bars 6 and are sandwiched between an insulating cover 4 and the cover 12 for support and insulation.

The above described construction has the following disadvantages. First, to ensure that the connectors 10 are smoothly brought into engagement with the vertical bus bars 5, the edges of the vertical bus bars 5 have to be beveled. Also, a large current due to short circuit accident may cause an electromagnetic force urging the connectors 10 to open sidewardly and separate from the bus bars 5. The separation may cause arcing, and therefore welding between the connector 10 and the bus bar 5.

SUMMARY OF THE INVENTION

An object of the invention is to provide an enclosed switchboard assembly in which the connector of a unit device is smoothly brought into engagement with a vertical bus bar.

Another object of the invention is to provide an enclosed switchboard which prevents arcing between the connector of a unit device and a vertical bus bar even when the connector of the unit device opens sidewardly due to a short circuit current.

A further object of the invention is to provide an enclosed switchboard wherein a horizontal bus bar and a vertical bus bar of the same phase are securely connected and the insulation between a horizontal bus bar and a vertical bus bars of different phases is improved.

According to the invention, there is provided an enclosed switchboard having a vertical bus bar supported by an insulating cover and unit chambers situated in front of the vertical bar and tiered one above the other for accommodating unit devices, each unit device having a stab-type connector including a tongue-shaped contact for establishing electrical contact with the vertical bus bar, characterized in that the insulating cover includes a vertically extending channeled portion having a bed and side walls to define a bus way on the front side of the insulating cover, the vertical bus bar includes a web in flat engagement with the front face of the bed of the channeled portion, a vertically extending protrusion protruding from the web forwardly, and a flange extending from one of the edges of the web and being in flat engagement with the inner face of one of the side walls of the channeled portion, the protrusion being positioned close to the flange so that as the contact moves sidewardly away from the protrusion it is brought into contact with the flange.

DETAILED DESCRIPTION OF THE PREFERRED EMBODIMENT

Figure 1:
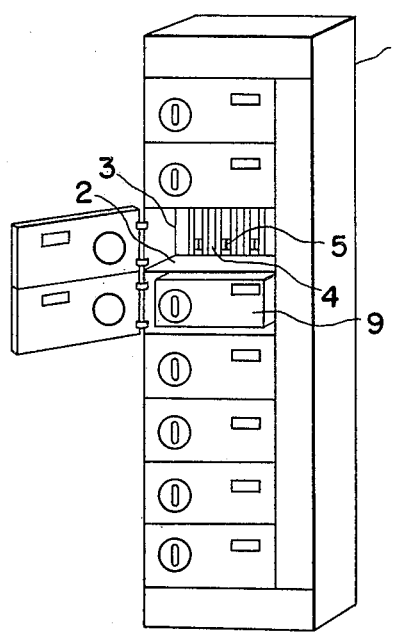
FIG. 1 is a perspective view showing an enclosed switchboard.
Figure 6:
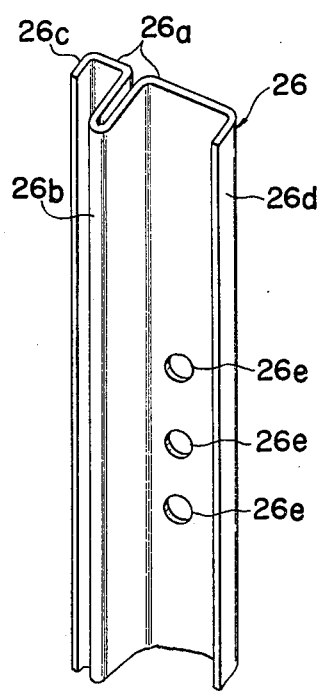
FIG. 6 is a perspective view of the vertical bus bar of the bus bar assembly shown in FIG. 4.
Figure 2:
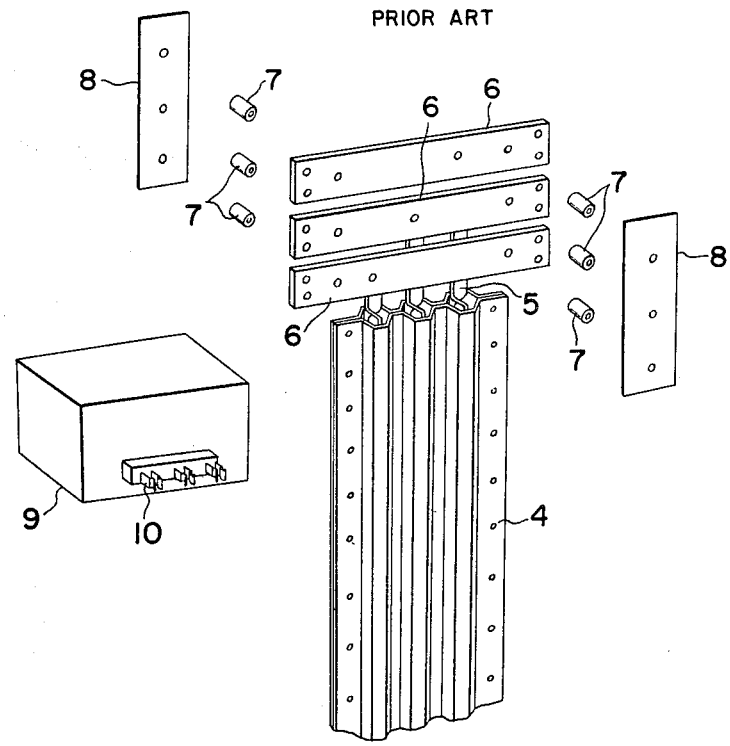
FIG. 2 is an exploded view showing an enclosed bus bar assembly.
Figure 4:
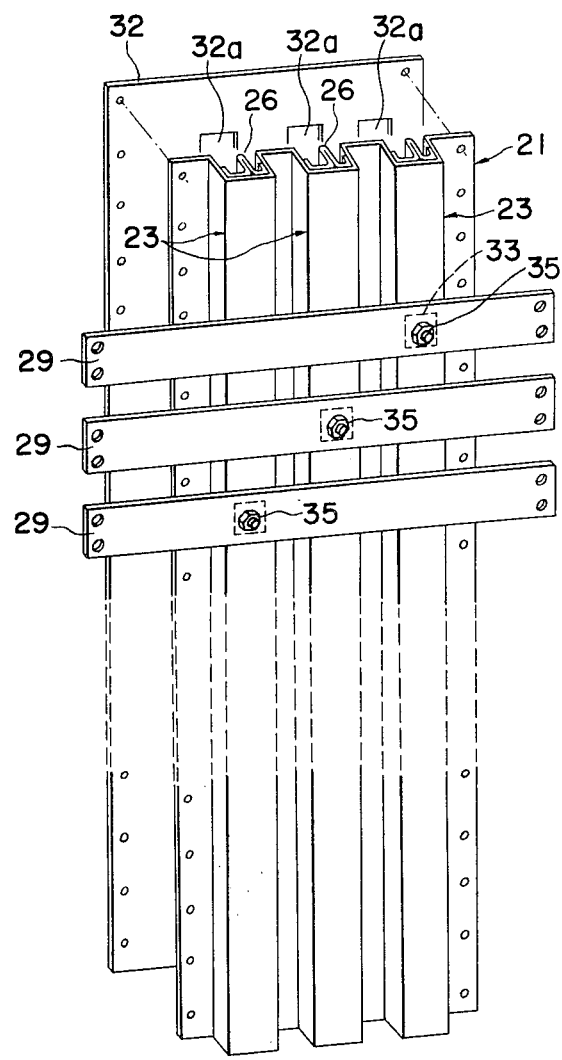
FIG. 4 is a perspective view showing an improved bus bar assembly according to the invention.

The enclosed switchboard according to the invention may have a general construction similar to that shown in FIG. 1. It is featured by an improved bus bar assembly as will be described below in detail. FIG. 4 shows an example of the improved bus bar assembly according to the invention. The bus bar assembly of the example illustrated comprises an insulating cover 21 having three vertically extending channeled portions 23. In the channeled portions 23, vertical bus bars 26 are snugly fitted, which are assigned for respective phases of a three-phase electric power. The vertical bus bar 26 is better illustrated in FIGS. 5 and 6. As shown the vertical bus bar 26 is formed by bending a long strip of an electrically conductive material. Each vertical bus bar 26 comprises a web 26a in flat engagement with the front face 24a of the bed 24 of the channeled portion 23. The vertical bus bar 26 also comprises a vertically extending protrusion 26b protruding from the web 26a forwardly. The vertical bus bar 26 further comprises a pair of flanges 26c and 26d extending from the opposite edges of the web 26a. The flanges 26c and 26d are in flat engagement with the side walls 25a and 25b of the channeled portion 23.

As illustrated, the protrusion 26b is deviated toward one side from the center C of the width of the web 26a. On the side opposite to the protrusion 26b with respect to the center C, perforations 26e are provided. Three flat horizontal bus bars 29, each used for supplying each phase of three-phase electric power are provided at the rear of the insulating cover 21.

Each vertical bus bar 26 is connected to the horizontal bus bar 29 of the same phase by the use of a rectangular conductive spacer 33 which is fitted in a similarly rectangular opening 24a provided in the bed 24 of the channeled portion 23, and a bolt 34, with a nut 35, extending through one of the perforations 26e in the vertical bus bar 26 and similar perforations, not shown, in the spacer 33 and the horizontal bus bar 29. By the provision of the three perforations 26e, identical vertical bus bars 26 can be used for the three phases, and different perforations 26e are used depending on the phase for which the vertical bus bar 26 is used.

The spacer 33 has a greater thickness than the insulating cover 21. As a result, intimate contact is ensured between the spacer 33 and the vertical bus bar 26 and between the spacer 33 and the horizontal bus bar 29. On the other hand, an air gap G will be formed between the rear surfaces 24b of the beds 24 of the channeled portion 23 and the horizontal bus bars 29, at locations where the vertical bus bars 26 intersect the horizontal bus bars 29 of different phases. Thus, the vertical bus bars 26 are isolated from the horizontal bus bars 29 of the different phases, not only by the insulating cover 21 but also by an air gap G, and therefore electrical insulation between the vertical bus bars 26 and the horizontal bus bars of the different phases is enhanced.

A flat insulating cover 32 is provided in abutment with the flanges 21a of the insulating cover 21 to isolate the vertical bus bars 26 from the unit chambers. The insulating cover 32 has openings 32a to permit access of the connectors of the unit devices to the protrusions 26b.

When a unit device 40, similar to that 9 shown in FIG. 1, is inserted into the unit chamber, similar to the unit chamber 3 shown in FIG. 1, connectors 41 protruding from the rear of the unit device 40 are inserted through the openings 32a and are brought into engagement with the protrusions 26b.

As is conventional, each connector 41 comprises a flat base 41a, which is fixed, with a terminal member 42, to the unit device frame. A member 43, depicted by dotted lines to indicate that it is positioned above the section of FIG. 5, serves to connect the terminal 42 to a flexible conductor which in turn is connected to the internal circuit, not shown, in the unit device 40. The connector 41 also comprises a pair of tongue-shaped contacts 41b extending rearwardly from the side ends of the base portion 41a. The free end portions of the contacts 41b are sidewardly bent to form sidewardly bent portions 41c. As mentioned above, the vertical bus bar 26 is formed by bending, so that the protrusion 26b has chamfered edges. Accordingly, the contacts 41b with the sidewardly bent end portions 41c can be smoothly brought into engagement with the protrusion 26b. In the engaged position, the contacts 41b are resiliently pressed against the protrusion 26b.

The protrusion 26b is positioned close to the flange 26c, and, in the engaged position, one of the sidewardly bent portions 41c terminates at a point adjacent to the inner surface of the flange 26c. When a short circuit current flows through the base 41a and the contacts 41b, the contacts 41b are moved sidewardly and are separated from the protrusion 26b. With the conventional bus bar assembly, arc occurs across the contacts 41b and the protrusion 26b. But, according to the invention, as the contacts 41b are separated from the protrusion 26b, they will be immediately brought into contact with the inner surface of the flange so that the short circuit current can flow through the contacts 41b and the flange 26c and hence the arcing is minimized.

With the arrangement wherein the protrusion 26b is deviated to one side from the center C of the width of the web 26a and the perforations 26e are deviated to the other side, the width of the web 26a can be reduced without reduction of the area over which current is conducted between the vertical and the horizontal bus bars 26 and 29.

Figure 3:
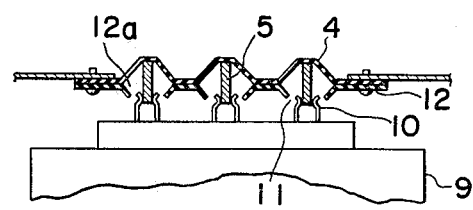
FIG. 3 is a sectional view showing how the connectors are engaged with the vertical bus bars of the bus bar assembly shown in FIG. 2.
Figure 5:
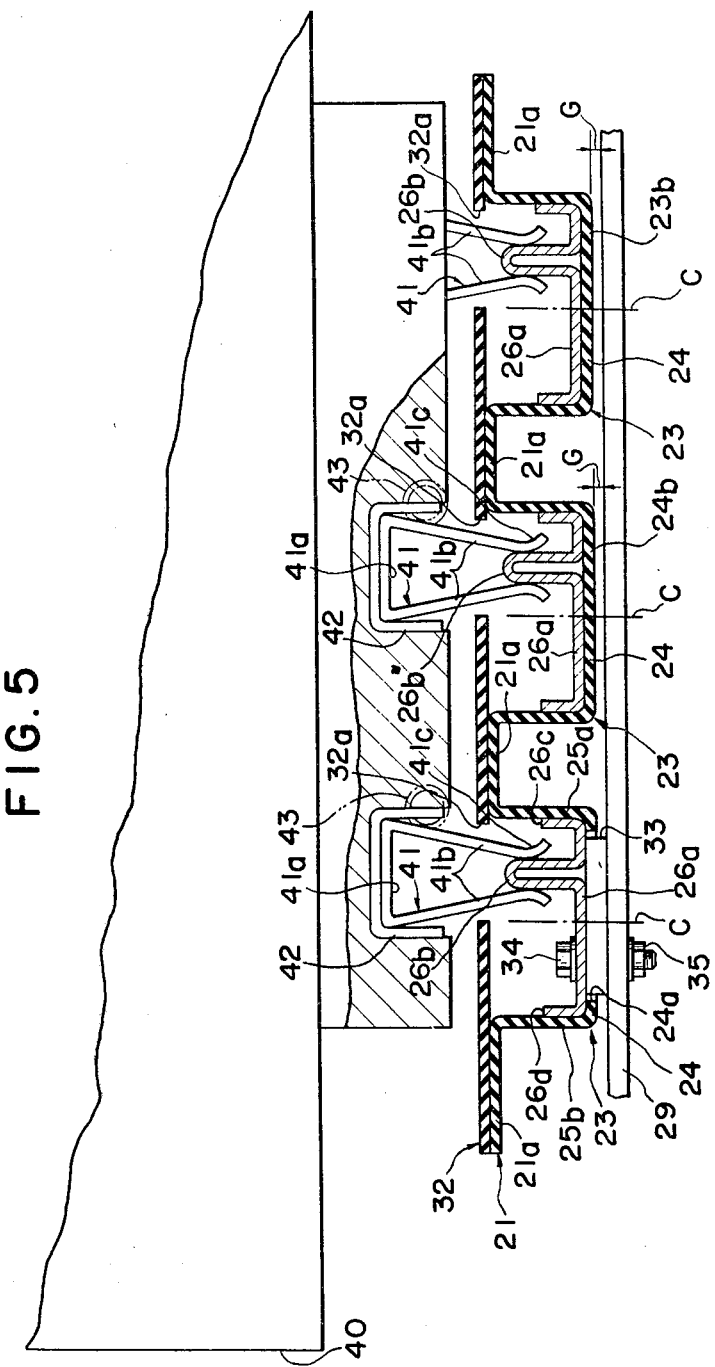
FIG. 5 is a sectional view showing how the connectors are engaged with the vertical bus bars of the bus bar assembly shown in FIG. 4.

The invention is not limited to the particular connector shown in FIG. 5 but is also applicable to an enclosed switchboard wherein unit devices have connectors of other configuration, for instance those shown in FIG. 3.

What is claimed is:

1. In an enclosed switchboard having a vertical bus bar supported by an insulating cover and unit chambers situated in front of said vertical bar and tiered one above the other and accommodating unit devices, each unit device having a stab-type connector including a tongue-shaped contact which establishes electrical contact with said vertical bus bar, the improvement in which said insulating cover includes a vertically extending channeled portion having a bed and side walls to define a bus way on the front side of said insulating cover, said vertical bus bar includes a web in flat engagement with the front face of said bed of said channeled portion, a vertically extending protrusion protruding from said web forwardly, and a flange extending from one of the edges of said web and being in flat engagement with the inner face of one of said side walls of said channeled portion, said protrusion being positioned close to said flange so that as said contact moves sidewardly away from said protrusion due to a short circuit current flowing through said contact it is brought into contact with said flange.

2. An enclosed switchboard according to claim 1, wherein said protrusion is formed by bending, to have chamfered edges.

3. An enclosed switchboard according to claim 1, wherein the free end of said contact is bent sidewardly and formed to terminate at a point adjacent to said flange when said contact is in engagement with said protrusion.

4. An enclosed switchboard according to claim 1, wherein said vertical bus bar further comprises a second flange extending from the other edge of said web and being in flat engagement with the inner face of the other side wall of said channeled portion.

5. An enclosed switchboard according to claim 1, wherein said vertical bus bar is formed by bending a strip of electrically conductive material.

6. An enclosed switchboard according to claim 1, further comprising a horizontal bus bar provided on the rear side of said insulating cover, and a spacer inserted in an opening provided in said bed of said channeled portion at a location where said vertical bus bar intersects said horizontal bus bar, said spacer being thicker than said bed of said channeled portion and being in contact, on one face thereof, with said web of said vertical bus bar and, on the other face thereof, with said horizontal bus bar.

7. An enclosed switchboard according to claim 6, wherein said protrusion is deviated from the center of the width of said web of said vertical bus bar, and a perforation is provided at a point deviated from said center to the opposite side to said protrusion and a bolt is made to extend through said perforation to hold together said vertical bus bar, said spacer and said horizontal bus bar.

8. In an enclosed switchboard having horizontal bus bars, vertical bus bars associated with the respective horizontal bus bars and supported by an insulating cover, and unit chambers situated in front of said vertical bus bars and tiered one above the other and accommodating respective unit devices, each unit device having stab-type connectors associated with the respective vertical bus bars, each connector including a tongue-shaped contact which establishes electrical contact with the associated one of said vertical bus bars, the improvement in which said insulating cover includes vertically extending channeled portions associated with the respective vertical bus bars, each channeled portion having a bed and side walls to define a bus way for accommodating the associated one of said vertical bus bars on the front side of said insulating cover, each of said vertical bus bars includes a web in flat engagement with the front face of said bed of the associated channeled portion, a vertically extending protrusion protruding from said web forwardly, a flange extending from one of the edges of said web and being in flat engagement with the inner face of one of said side walls of the associated channeled portion, said protrusion being positioned close to said flange so that as said contact moves sidewardly away from said protrusion due to a short circuit current flowing through said contact it is brought into contact with said flange, said horizontal bus bars are provided on the rear side of said insulating cover, and said enclosed switchboard further comprises spacers associated with the respective vertical bus bars and inserted in openings provided in said webs of the associated channeled portions at locations where the associated vertical bus bars intersect the associated horizontal bus bars, each of said spacers being thicker than said beds of the associated channeled portion and being in contact, on one face thereof, with said web of the associated vertical bus bar and, on the other face thereof, with the associated horizontal bus bar.

9. An enclosed switchboard according to claim 8, wherein said protrusion is deviated from the center of the width of said web of each vertical bus bar, and a perforation is provided at a point deviated from said center to the opposite side to said protrusion and a bolt is made to extend through said perforation to hold together the vertical bus bar, the associated spacer and the associated horizontal bus bar.

* * * * *